US011597087B2

(12) United States Patent
Johnson et al.

(10) Patent No.: US 11,597,087 B2
(45) Date of Patent: Mar. 7, 2023

(54) USER INPUT OR VOICE MODIFICATION TO ROBOT MOTION PLANS

(71) Applicant: The Charles Stark Draper Laboratory, Inc., Cambridge, MA (US)

(72) Inventors: David M. S. Johnson, Cambridge, MA (US); Syler Wagner, Somerville, MA (US); Anthony Tayoun, Cambridge, MA (US); Steven Lines, Brookline, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 340 days.

(21) Appl. No.: 16/571,040

(22) Filed: Sep. 13, 2019

(65) Prior Publication Data

US 2020/0086498 A1 Mar. 19, 2020

Related U.S. Application Data

(60) Provisional application No. 62/730,703, filed on Sep. 13, 2018, provisional application No. 62/730,947, (Continued)

(51) Int. Cl.
*G05D 11/02* (2006.01)
*G05D 11/16* (2006.01)
(Continued)

(52) U.S. Cl.
CPC ........... *B25J 9/1666* (2013.01); *B25J 9/0009* (2013.01); *B25J 9/16* (2013.01); *B25J 9/161* (2013.01);
(Continued)

(58) Field of Classification Search
CPC ...... B25J 9/1666; B25J 9/1682; B25J 9/1676; B25J 9/1687; B25J 9/16; B25J 19/0083;
(Continued)

(56) References Cited

U.S. PATENT DOCUMENTS 4,512,709 A 4/1985 Hennekes
4,513,709 A 4/1985 Hennekes
(Continued)

FOREIGN PATENT DOCUMENTS

CN 106313068 A 1/2017
CN 107092209 A 8/2017
(Continued)

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.
(Continued)

*Primary Examiner* — Abby Y Lin
*Assistant Examiner* — Sohana Tanju Khayer
(74) *Attorney, Agent, or Firm* — Hamilton, Brook, Smith & Reynolds, P.C.

(57) ABSTRACT

In an embodiment, a method during execution of a motion plan by a robotic arm includes determining a voice command from speech of a user said during the execution of the motion plan, determining a modification of the motion plan based on the voice command from the speech of the user, and executing the modification of the motion plan by the robotic arm.

16 Claims, 9 Drawing Sheets

Related U.S. Application Data filed on Sep. 13, 2018, provisional application No. 62/730,933, filed on Sep. 13, 2018, provisional application No. 62/730,918, filed on Sep. 13, 2018, provisional application No. 62/730,934, filed on Sep. 13, 2018, provisional application No. 62/731,398, filed on Sep. 14, 2018.

(51) Int. Cl.

| | |
|---|---|
| *G05D 11/00* | (2006.01) |
| *B25J 9/16* | (2006.01) |
| *B25J 13/00* | (2006.01) |
| *B25J 13/08* | (2006.01) |
| *G06N 3/08* | (2023.01) |
| *G10L 15/22* | (2006.01) |
| *B65G 1/137* | (2006.01) |
| *B25J 9/00* | (2006.01) |
| *B25J 15/00* | (2006.01) |
| *G06Q 10/0631* | (2023.01) |
| *B25J 11/00* | (2006.01) |
| *B25J 15/04* | (2006.01) |
| *B25J 19/02* | (2006.01) |
| *G05D 1/02* | (2020.01) |
| *B25J 19/00* | (2006.01) |
| *G06V 40/20* | (2022.01) |
| *H04L 67/12* | (2022.01) |
| *G05B 19/4061* | (2006.01) |
| *A47J 44/00* | (2006.01) |

(52) U.S. Cl.
CPC .......... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(58) Field of Classification Search
CPC .. B25J 11/0045; B25J 15/0408; B25J 9/1653; B25J 9/1664; B25J 9/1674; B25J 9/161; B25J 9/1697; B25J 13/003; B25J 13/085; B25J 13/088; B25J 9/1633; B25J 9/0009; B25J 15/0052; B25J 19/023; G06Q 10/06316; G05D 1/02; A47J 44/00; G05B 2219/39342; G05B 2219/39468; G05B 2219/39319; G05B 2219/40497; G05B 2219/39091; G05B 2219/49157; G05B 2219/40201; G05B 2219/40411; G05B 19/4061; G05B 2219/40202; G05B 2219/32335; G05B 2219/39001; G05B 2219/45111; G05B 2219/50391; G06K 9/00355; G06N 3/08; G10L 15/22; B65G 1/137; H04L 67/12

See application file for complete search history.

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 | 11/2015 | Edsinger et al. |
| 9,189,742 B2 | 11/2015 | London |
| 9,259,840 B1 | 2/2016 | Chen |
| 9,346,164 B1 | 5/2016 | Edsinger et al. |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1* | 10/2019 | Quinlan .............. G06F 3/017 |
| 11,016,491 B1 | 5/2021 | Millard |
| 11,116,593 B2* | 9/2021 | Hashimoto ............ B25J 13/087 |
| 11,351,673 B2 | 6/2022 | Zito et al. |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 | 9/2004 | Zhang |
| 2005/0004710 A1 | 1/2005 | Shimomura et al. |
| 2005/0171643 A1 | 8/2005 | Sabe et al. |
| 2005/0193901 A1* | 9/2005 | Buehler .............. A47J 44/00 99/468 |
| 2005/0283475 A1 | 12/2005 | Beranik |
| 2006/0137164 A1 | 6/2006 | Kraus |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1 | 5/2010 | Tsusaka et al. |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1 | 10/2011 | Takazakura et al. |

(56) References Cited

U.S. PATENT DOCUMENTS

| | | |
|---|---|---|
| 2012/0016678 A1 | 1/2012 | Gruber |
| 2012/0255388 A1 | 10/2012 | McClosky |
| 2012/0290134 A1 | 11/2012 | Zhao et al. |
| 2013/0079930 A1 | 3/2013 | Mistry |
| 2013/0103198 A1 | 4/2013 | Nakamoto et al. |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1 | 4/2015 | Roy |
| 2015/0117156 A1 | 4/2015 | Xu et al. |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1* | 10/2015 | Linnell ............... G05B 19/42 700/257 |
| 2015/0375402 A1 | 12/2015 | D Andreta |
| 2016/0016315 A1 | 1/2016 | Kuffner et al. |
| 2016/0073644 A1 | 3/2016 | Dickey |
| 2016/0075023 A1 | 3/2016 | Sisbot |
| 2016/0103202 A1 | 4/2016 | Sumiyoshi et al. |
| 2016/0291571 A1 | 10/2016 | Cristiano |
| 2016/0372138 A1 | 12/2016 | Shinkai et al. |
| 2017/0004406 A1 | 1/2017 | Aghamohammadi |
| 2017/0080565 A1 | 3/2017 | Dalibard |
| 2017/0087722 A1 | 3/2017 | Aberg et al. |
| 2017/0133009 A1 | 5/2017 | Cho et al. |
| 2017/0168488 A1 | 6/2017 | Wierzynski |
| 2017/0178352 A1 | 6/2017 | Harmsen et al. |
| 2017/0326728 A1* | 11/2017 | Prats ................. B25J 9/1612 |
| 2017/0334066 A1 | 11/2017 | Levine |
| 2017/0354294 A1 | 12/2017 | Shivaiah |
| 2017/0361461 A1 | 12/2017 | Tan |
| 2017/0361468 A1 | 12/2017 | Cheuvront et al. |
| 2018/0043952 A1 | 2/2018 | Ellerman et al. |
| 2018/0056520 A1 | 3/2018 | Ozaki |
| 2018/0070776 A1 | 3/2018 | Ganninger |
| 2018/0121994 A1 | 5/2018 | Matsunaga et al. |
| 2018/0144244 A1* | 5/2018 | Masoud ............... G06N 3/105 |
| 2018/0147718 A1 | 5/2018 | Oleynik |
| 2018/0147723 A1 | 5/2018 | Vijayanarasimhan |
| 2018/0150661 A1 | 5/2018 | Hall et al. |
| 2018/0200014 A1 | 7/2018 | Bonny et al. |
| 2018/0200885 A1 | 7/2018 | Ikeda et al. |
| 2018/0202819 A1 | 7/2018 | Mital |
| 2018/0214221 A1 | 8/2018 | Crawford et al. |
| 2018/0257221 A1 | 9/2018 | Toothaker et al. |
| 2018/0275632 A1 | 9/2018 | Zhang et al. |
| 2018/0338504 A1 | 11/2018 | Lavri et al. |
| 2018/0345479 A1 | 12/2018 | Martino et al. |
| 2018/0348783 A1 | 12/2018 | Pitzer et al. |
| 2018/0354140 A1* | 12/2018 | Watanabe ............ B25J 9/1661 |
| 2019/0001489 A1* | 1/2019 | Hudson ............... G06N 3/0454 |
| 2019/0039241 A1 | 2/2019 | Langenfeld et al. |
| 2019/0049970 A1 | 2/2019 | Djuric et al. |
| 2019/0056751 A1 | 2/2019 | Ferguson et al. |
| 2019/0066680 A1 | 2/2019 | Woo et al. |
| 2019/0212441 A1 | 7/2019 | Casner et al. |
| 2019/0291277 A1* | 9/2019 | Oleynik ............... B25J 9/1669 |
| 2019/0310611 A1 | 10/2019 | Jain |
| 2019/0321989 A1 | 10/2019 | Anderson et al. |
| 2019/0381617 A1 | 12/2019 | Patrini et al. |
| 2020/0023520 A1 | 1/2020 | Yoshizumi |
| 2020/0030966 A1 | 1/2020 | Hasegawa |
| 2020/0047349 A1 | 2/2020 | Sinnet et al. |
| 2020/0070355 A1* | 3/2020 | Neumann ............ B25J 13/084 |
| 2020/0073358 A1 | 3/2020 | Dedkov et al. |
| 2020/0073367 A1 | 3/2020 | Nguyen et al. |
| 2020/0086437 A1 | 3/2020 | Johnson |
| 2020/0086482 A1 | 3/2020 | Johnson |
| 2020/0086485 A1 | 3/2020 | Johnson |
| 2020/0086487 A1 | 3/2020 | Johnson |
| 2020/0086497 A1 | 3/2020 | Johnson |
| 2020/0086502 A1 | 3/2020 | Johnson |
| 2020/0086503 A1 | 3/2020 | Johnson |
| 2020/0086509 A1 | 3/2020 | Johnson |
| 2020/0087069 A1 | 3/2020 | Johnson |
| 2020/0090099 A1 | 3/2020 | Johnson |
| 2020/0298403 A1 | 9/2020 | Nilsson et al. |
| 2022/0066456 A1* | 3/2022 | Ebrahimi Afrouzi ............ G05D 1/0246 |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A1 | 6/2015 |
| GB | 2550396 A | 11/2017 |
| JP | 2004295620 | 10/2004 |
| JP | 200849462 A | 3/2008 |
| JP | 2020028957 | 2/2020 |
| WO | 99/03653 A1 | 1/1999 |
| WO | 2005072917 A1 | 11/2005 |
| WO | 2007/122717 A1 | 11/2007 |
| WO | 2009045827 A2 | 4/2009 |
| WO | 20150117156 A | 8/2015 |
| WO | 20170197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning" A Constraint-Based Approach, Robotics: Science and Systems 12, 00052, 2016.

Ferrer-Mestres, J., et al., "Combined Task and Motion Planning as a Classical AI Planning" arXiv preprint arXiv:1706.06927, 2017—arxiv.org; Jun. 21, 2017.

Kaelbling, L.P, et al., "Integrated task and motion planning in beliefe space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv:1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

(56) References Cited

OTHER PUBLICATIONS

Srivastava, S., et al. "Combined Task and Motion Planning Through an Extensible Planner-Independent Interface Layer"; 2014 IEEE international conference on robotics and automation (ICRA), 639-646.
Stentz, A., et al., "A Robotic Excavator for Autonomous Truck Loading", In Proceedings of the IEEE/RSJ International Conference on Intelligent Robotic Systems, 1998.
Villegas, et al, "Learning to Generate Long-term Future via Hierarchical Prediction", In Proceedings of the 34th International Conference on Machine Learning (ICML), 2017.
Walker, J., et al.,"The pose knows: Video forecasting by generating pose futures", In The IEEE International Conference on Computer Vision (ICCV), Oct. 2017.
Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.
Wong, J.M., et al., "SegICP-DSR: Dense Semantic Scene Reconstruction and Registration", Draper, arXiv:1711.02216; Nov. 6, 2017.
Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.
Wu, J., et al., "Real-Time Object Pose Estimation with Pose Interpreter Networks", IEEE/RSJ International Conference on Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleur du Chef," Retrieved from the Internet: URL: https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How To Assemble A Meal".
International Search Report and Written Opinion for PCT/US2019/051175 dated Jan. 3, 2020 entitled Stopping Robot Motion Based On Sound Cues.
Dexai Robotics: "Alfred Sous-Chef scooping ice-cream" Youtube, retrieved from Internet Jun. 8, 2018. https://www.youtube.com/watch?v=caNG4q.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051177 dated Jan. 9, 2020 entitled "Voice Modification to Robot Motion Plans".
International Search Report and Written Opinino for PCT/US2019/051183 dated Jan. 14, 2020 entitled "Locating and Attaching Interchangeable Tools In-Situ".
International Search Report and Written Opinion for PCT/US2019/051067 dated Jan. 16, 2020 entitled "Robot Interaction With Human Co-Workers".
International Search Report and Written Opinion for PCT/US2019/051161 dated Jan. 15, 2020 entitled "Food-Safe, Washable Interface For Exchanging Tools".
ATI Industrial Automation: Automatic/Robotic Tool Changers, "Automatic/RoboticTool Changes", Tool Changer News. Downloaded from Internet Feb. 4, 2020. https://www.ati-ia.com/products/toolchanger/robot_tool_changer.aspx.
Dexai Robotics: "A Robot Company is Born", retrieved from Internet from Feb. 5, 2020. https://draper.com/dexai-robotics.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable and Deformable Materials Using Articulated Manipulators".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
International Search Report and Written Opinion for PCT/US2019/051061 dated Apr. 2, 2020 entitled "Controlling Robot Torque and Velocity Based On Context".
International Search Report and Written Opionion for PCT/US2019/051180 dated Jan. 31, 2020 entitled "One-Click Robot Order".
Yang et al., "Obstacle Avoidance through Deep Networks based Intermediate Perception", Apr. 27, 2017, The Robotics Instiute, Carnegie Mellon University (Year: 2017).
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Charabaruk, Nicholas; "Development of an Autonomous Omnidirectional Hazardous Material Handling Robot";. University of Ontario Institute of Technology (Canada). ProQuest Dissertations Publishing, 2015. 10006730. (Year: 2015).
Langsfeld, Joshua D..; "Learning Task Models for Robotic Manipulation of Nonrigid Objects"; University of Maryland, College Park. ProQuest Dissertations Publishing, 2017. 10255938. (Year: 2017).
Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

* cited by examiner

USER INPUT OR VOICE MODIFICATION TO ROBOT MOTION PLANS

RELATED APPLICATIONS

This application claims the benefit of U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018, U.S. Provisional Application No. 62/730,934, filed on Sep. 13, 2018, U.S. Provisional Application No. 62/731,398, filed on Sep. 14, 2018.

This application is related to U.S. patent application Ser. No. 16/570,100, U.S. patent application Ser. No. 16/570,855, U.S. patent application Ser. No. 16/570,955, U.S. patent application Ser. No. 16/571,003, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/570,606, and U.S. patent application Ser. No. 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

Traditionally, robots operate in constrained environments with previously known parameters, and without continuous and seamless interaction with humans. With the advancements of robotics in both hardware and software, robots are increasingly working alongside humans in unconstrainted and unpredictable environments. However, there are currently no known methods for humans to interact with robots that are performing tasks by modifying those tasks using natural language in an efficient and reliable manner. Current methods to command robots require tactile input such as with a button or switch and often use additional displays to give the user additional information about the robot's internal state to aid in directing it to modify its current task. Using natural language and the context of the current robot motion allows the user to interact with the robot without requiring detailed knowledge of the robot's current internal state.

In embodiments, the below disclosure solves problems in relation to employing robotics in the quick service fast food restaurant environment.

In an embodiment, a method includes, during execution of an action of a group of actions by an autonomous system, determining a given action of the group of actions to modify based on user input received during the execution of the group of actions. The method further includes, during execution of the action of the group of actions by the autonomous system, modifying the given action of the group of actions based on the user input. The method further includes, during execution of the action of the group of actions by the autonomous system, executing, by the autonomous system, the group of actions modified based on the user input.

In an embodiment, modifying the given action further can include: (a) determining a new action as the given action, (b) modifying a quantity of material associated with the given action, (c) removing the given action from the plurality of actions, (d) changing a type of material associated with a given action, and (e) repeating a previous action of the plurality of actions. Modifying the given action can further include calculating a transition motion plan to align the autonomous system with a pose within (a) the new motion plan and (b) the previously unselected motion plan.

A person having ordinary skill in the art can recognize that an autonomous system can be a robot or robotic arm, as illustrated in FIG. 1 and described below.

In an embodiment, the user input is speech, a gesture as detected by a camera, or an input from a control.

In an embodiment, the group of actions is a sequence of ordered actions.

In an embodiment, the method further includes, during execution of the action of the group of actions by the autonomous system, notifying the user with information regarding the given action modified either through a visual display, an audio alert, or indication via motion of the autonomous system.

In an embodiment, the given action of the group of actions has been previously executed by the autonomous system. The method further includes, during execution of the action of the group of actions by the autonomous system, generating one or more modified actions to undo the previously executed given action.

In an embodiment, a system includes a processor and a memory with computer code instructions stored thereon. The processor and the memory, with the computer code instructions, are configured to cause the system to, during execution of an action of a plurality of actions by an autonomous system, determine a given action of the plurality of actions to modify based on user input received during the execution of the plurality of actions. The instructions are further configured to, during execution of the action of the group of actions by the autonomous system, modify the given action of the plurality of actions based on user input. The instructions are further configured to, during execution of the action of the group of actions by the autonomous system, execute, by the autonomous system, the plurality of actions modified based on the user input.

In an embodiment, a method includes, during execution of an action of a plurality of actions by an autonomous system, assigning a confidence weight to the plurality of actions based on a received user input. The method further includes, during execution of an action of a plurality of actions by an autonomous system, modifying a model or neural network that generates a second plurality of actions based on the confidence weight.

In an embodiment, the user input is positive, neutral, or negative feedback in relation to at least one of the plurality of actions.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1A:
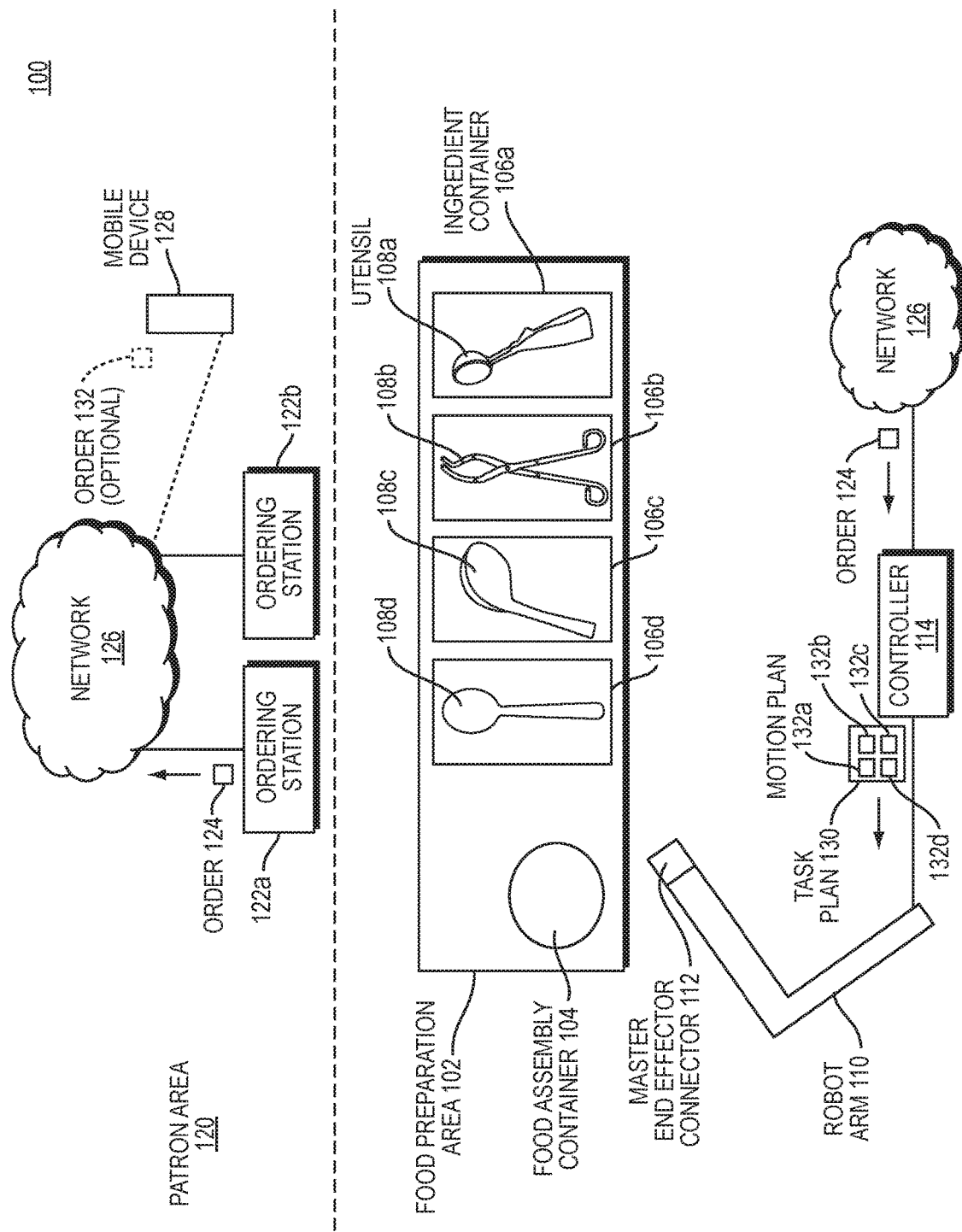
FIG. 1A is a block diagram illustrating an example embodiment of a quick service food environment 100 of embodiments of the present invention.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack 109. The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-e, gather ingredients from the respective ingredient container 106a-d, and empty the utensil 108a-e in an appropriate location of a food assembly container 104 for the patron, which can be a plate, bowl, or other container. The robot arm 110 then returns the utensil 108a-e to its respective ingredient container 106a-d, the tool rack 109, or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

Manipulation of deformable materials and movable objects can be challenging for autonomous systems. Automatically generated plans and motions may be sub-optimal, and therefore improvable as defects become apparent to human or other operators. Therefore, embodiments of this disclosure solve the problem of modifying the actions (e.g., a task plan or motion plan) of an autonomous system as the actions are in progress, without requiring a full stop or restart, and without requiring an operator to intervene using a mechanical input device such as a button, keyboard, mouse, or motion tracker.

For example, when using a robot arm to scoop ice cream, the disher tool might not dig deep enough to extract a full scoop, or the viscosity of the ice cream may cause it to fall out of or otherwise escape the tool. In another example, when shoveling powdery snow, the snow may bounce out of a moving shovel or be blown by wind. In another example, when using a bulldozer to clear debris, the debris may be moved by other forces or is constrained by attachments, such as cabling or rebar. In another example, when manipulating food stuffs of variable consistencies, the food stuffs may not be manipulated as anticipated. In another example, when picking up moving objects, the movement of the object interacts or interferes with an end-effector of a robot.

The approach of the present disclosure enables a robot to autonomously select and manipulate material or objects that may change in ways that may be difficult to predict by computational modeling or other autonomous prediction. Therefore, this disclosure enables these plans for selecting and manipulating material or objects to be subject to subsequent guidance and plan-modification via voice input during the manipulation. For example, when scooping ice cream, if self-adhesion begins pulling a partial scoop out of the right side of the disher tool, the scoop may be saved by altering the disher's trajectory so that it veers rightward. For a human scooping ice cream, it is easy to recognize this problem and remedy it as it occurs. In robotics, current state of the art does not solve this problem on a pure automation level. Therefore, human intervention via human speech can improve the robotic system by recognizing voice commands in real-time, such as the command "move a little to the right." Therefore, voice commands can thus improve a robot system's performance in such tasks by providing an interface for input from a human for adjustments that a human can better determine.

Additionally, these verbal signals may be used to infer quality or corrective action which can serve as data for training a neural network. As an example, while the robot is performing an action, a user saying positive feedback like "yes" or "good" can train the neural network that the action being performed is desired given the order, the robot's environment, state of ingredients, etc. Conversely, a user saying negative feedback like "no," "bad," or "stop" can train the neural network that the action being performed is not desired given the order, the robot's environment, state of ingredients, etc.

Plans and trajectories for the automatic manipulation of materials and objects can be difficult to compute and costly to execute. Robotic actions based on heuristics and approximations may be improvable in real-time by way of recognized speech commands or commentary. Because materials and objects change during manipulation, actual shapes and other properties of the materials and objects may deviate from expectations. Before manipulation, the system stores a collection of possible motion plans with many variations and sequences of interchangeable components, as well as collection of recognizable speech commands and modifiers, as in verbs and adverbs. Mapping commands to plan components allows speech commands, when recognized by the system, to generate changes in the execution of motion and manipulation plans while in-progress. For example, a plan in progress may include torque limits and a trajectory including a sequence of points in a multidimensional space. This is further described in both U.S. patent application titled "Manipulating Fracturable And Deformable Materials Using Articulated Manipulators", Ser. No. 16/570,100 and U.S. patent application titled "Controlling Robot Torque And Velocity Based On Context", Ser. No. 16/570,736.

Upon recognizing the commands "turn right, softer", or "softer, rightward", the system decreases the torque limits and turns the current trajectory in the specified relative direction (e.g., by geometrics transformation, or by splicing into a different saved trajectory). In addition to specific commands, any other speech input may be recorded and used as input for more general purposes, such as a reinforcement learning system.

Based on the current state and executing plan, any recognized speech command is mapped to possible changes of state and plan. Current observed conditions and states may also inform the automatic speech recognition system. Recognized speech can be treated as an event and fed into a finite state machine (FSM) or other system controller. Some events may of course have no effect. In other words, the robotic system uses motion and physical feedback as inputs to determine the outside world and adjust in real time. However, in embodiments of the present disclosure, the system further includes voice or acoustic input in combination with other inputs.

Speech input may be processed in current time or later, offline, as potential input for automatic or other improvements to the system. For example, a comment such as "that's a good scoop" may be correlated with the measured result of the action and used as input for a machine learning system. To determine which speech may be used as command and/or comment input, the system may use some combination of wake-up word recognition, command-prefix recognition, and speaker recognition (e.g., to identify an operator, as opposed to an on-looker).

In an embodiment, the disclosure employs a speech sensing and recognition apparatus (e.g., a microphone array connected to a computer or controller) in conjunction with a robot system (e.g., a jointed arm, end-effector, and connected cameras) which is able to manipulate the chosen materials or objects.

The robotic system (e.g., a controller) determines the current state of the world it can modify or change. The controller computes trajectories and other plan components for manipulating materials and objects in that world. The speech recognition system feeds additional events as input to the system controller, and the controller can modify the trajectories and other plan components (e.g., task plan, motion plan) based on all combined inputs. The robot executes the plan components, which the system controller monitors and corrects as they are executed. An operator voices commands and comments during execution (closed loop behavior) or commentary-only on the result of an executed plan (open loop). During execution, recognized commands become events fed into the controller, which may change plans and their executions in current time. Commentary may be used later to improve the system, as in becoming input to machine learning.

Several alternative methods can be used. For example, brute force with no operator intervention is an alternative. Modeling deformable materials and moveable objects requires a multi-dimensional state space and is subject to combinatorial explosion. Attempting to limit the size of the state space using heuristics and pruning is difficult, and may be intractable in some domains of interest, such as scooping ice cream or assembling salads.

In an alternate approach, an operator may intervene using a keyboard, pointer, or other mechanical input device. However, this means that operators must remain near the keyboard or other device, or use their hands. Automated speech recognition allows hands-free mobility.

In an alternate approach, the system can allow re-tries/repeated attempts after failed plan executions. Instead of fixing failed plans or handling unforeseen contingencies in real-time, plans may be executed to completion, upon which the system or operator evaluates the result as deficient, and the system executes another plan. This increases costs of both time and materials.

In a known system ASR is used to input commands to robots, but does not disclose changing complex plans during execution.

Typically, interactive robots execute simple commands without intervention, and robots that execute long-running plans, such as painting a car chassis, are not interactive.

Applicant's approach can use a combination of automatic speech recognition, search, neural nets, and model-based force control to accomplish the desired results. No previous approach combined these technologies to provide a better result of allowing real-time human input to be considered as an input to allow modification of a robot's path during operation.

Manipulation of deformable and granular materials using a robot can be difficult to plan, execute, and change while in progress. Failures may result in loss of material. Enabling operator intervention through a natural language like interface can thus save both time and materials.

This approach is meant to allow human experience to improve robot system performance both in real-time and in offline machine learning. Implementing a feedback loop between automatic speech recognition and semi-autonomous performance of complex tasks may support improvements in both, in these specific domains.

Figure 1B:
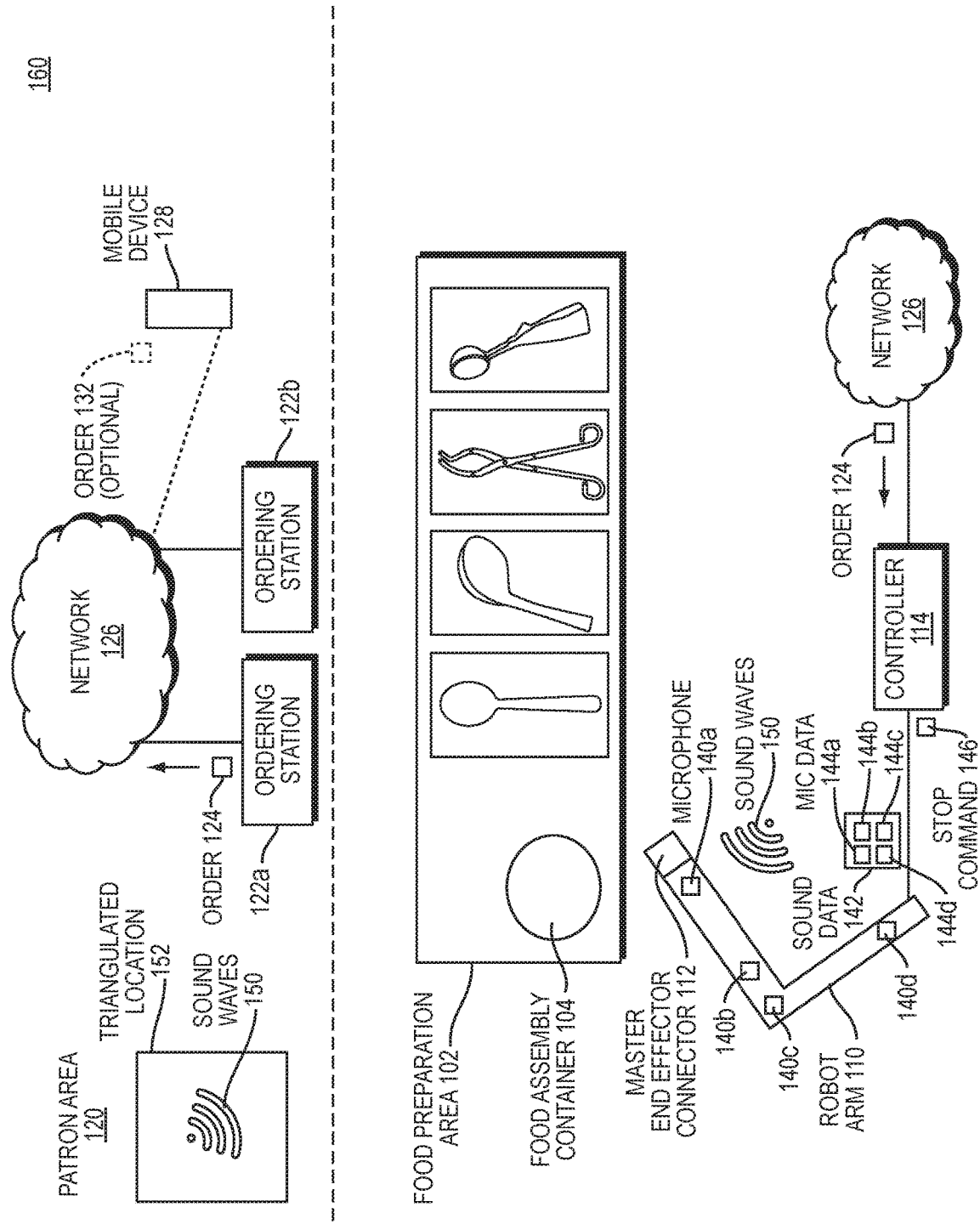
FIG. 1B is a block diagram illustrates an example embodiment of the present disclosure.

FIG. 1B is a block diagram 160 illustrates an example embodiment of the present disclosure. In a similar environment as FIG. 1A, an array of several microphones 140a-d are mounted on the robot arm 110. The microphones 140a-d are configured to detect and record sound waves 142. As the microphones 140a-d record the sound data 142, it is reported to a controller 114. The sound data 142 can be organized into data from individual microphones as mic data 144a-d. The controller can process the sound data 142 and if a trigger word is detected (e.g., stop or ouch) then it can issue a stop command 146.

FIG. 1B further illustrates sound waves 150 beginning from the patron area 120. With the multiple microphones 140a-d, the controller 114 can determine a triangulated location 152 of the sound waves 150, and provide the sound waves 150 a lower weight or ignore the sound waves 150 entirely because the determined triangulated location 152 is within the patron area 120.

Figure 2:
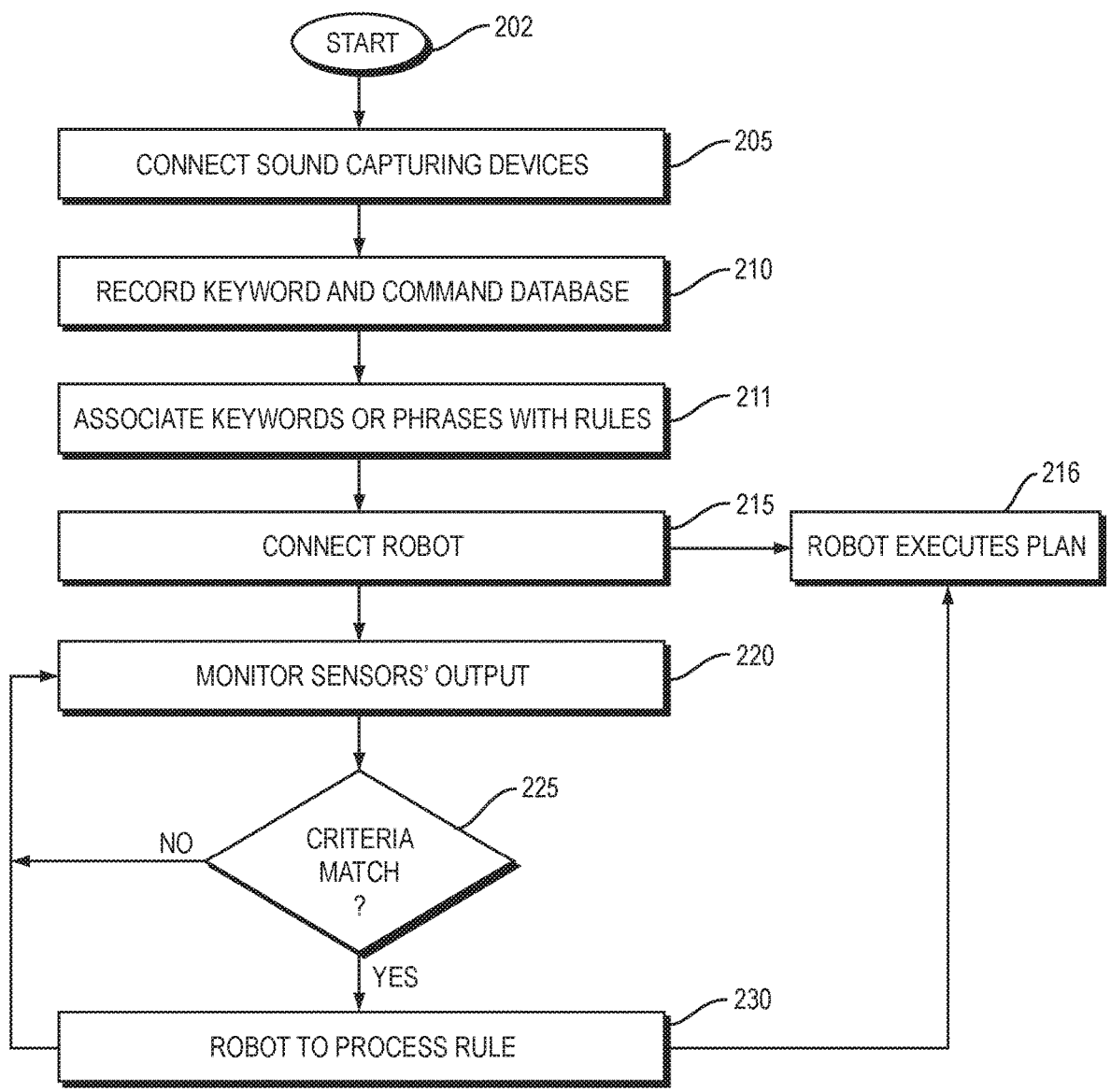
FIG. 2 is flow diagram illustrating an embodiment of a process of the present disclosure.

FIG. 2 is flow diagram 200 illustrating an embodiment of a process of the present disclosure. The process illustrated by FIG. 2 may be implemented by a processor executing computer program code in combination with the appropriate hardware (e.g., memory, robotics, etc.). The computer program code may be stored on storage media, or may be transferred to a workstation over the Internet or some other type of network.

After initialization (200), the process connects sound capturing devices to the system (205). The sound capturing devices can, for example, be a microphone or an array of microphones. In embodiments, the array of microphones is used to detect the source (e.g., 2-dimensional or 3-dimensional location) of the sound.

The process then builds a keyword and command database (210). The keyword and command database is indexed and searchable by different parameters such as keywords, etc. The keyword and command database can either be built through a computer software that copies pre-defined keywords and sounds, by a live recording of a sound or keywords narrated by a human speaker, or through any other simulation of the keywords or sounds (e.g., a generation function training a neural network). In an embodiment, the process can dynamically update the keyword and command database based on self-generated feedback by the system or manually inputted feedback from a user to a particular recording.

The process then defines a set of rules and associates those rules with different keywords and commands (211). The rules can be pre-defined and copied via a computer software or can change dynamically based on user input. The rules can also dynamically change based on feedback captured by the overall system.

The process then connects the robot to the system (215). The robot may provide information to the overall system, such as motion data, image capture data, or other sensor output.

The robot then executes/performs the plan (216). The plan can be run by the same software described above or by an independent compatible software that is previously programmed.

The process then monitors sounds (220). The process checks whether a keyword and/or phrase and/or command has been detected by matching measured information with the pre-built database (225). The checking/determining may involve receiving words and phrases from a system that processes this data, the processing including removing noise or performing other transformations to the data. If no match occurs, then the monitoring process continues (220). However, if a match is detected, the system executes and processes the rule or rules (230). These rules can be executed by the robot, such as to change the robot's plan (216). Optionally, the rules can be dynamically updated based on the fact that this rule or rules have been executed (not shown). Optionally, the database of keywords and commands can be updated based on the fact that this rule or rules have been executed (not shown).

Figure 3A:
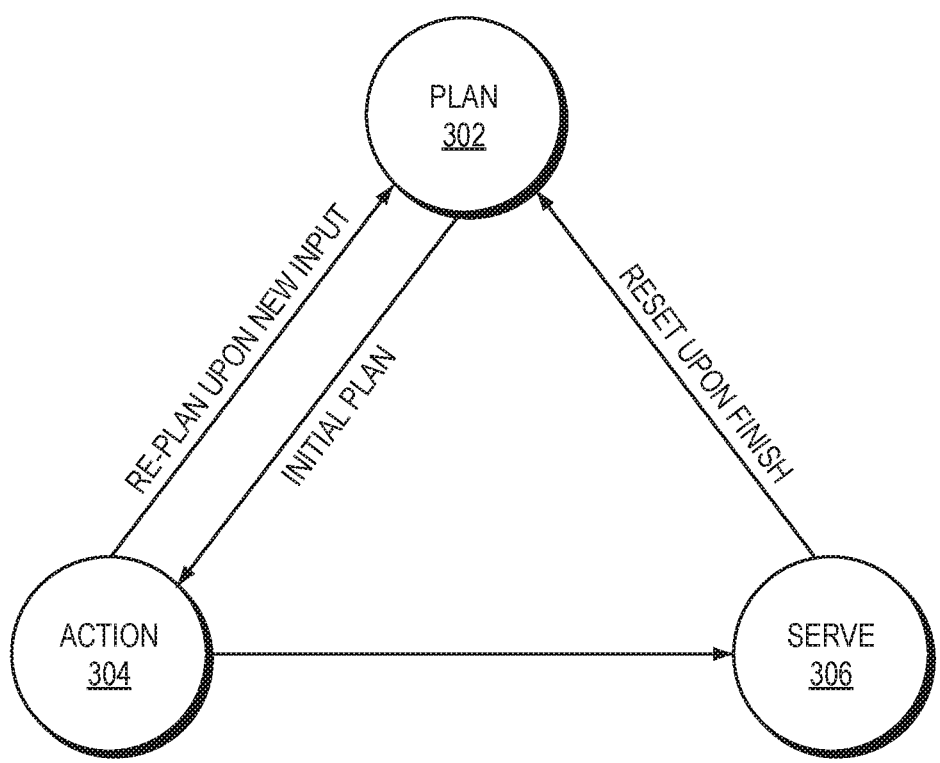
FIG. 3A is a state diagram illustrating an embodiment of robot decision making.

FIG. 3A is a state diagram 300 illustrating an embodiment of robot decision making. Traditionally, upon a request for modification, the plan is cancelled and begun again from the beginning. The state begins with creating a plan 302 for the robot. After the plan is created, the robot executes the action 304. However, upon new inputs, the action can be reset back to the planning stage 302. When the actions are completed, the robot enters a serve state 306, which resets the state diagram back to the planning state 302 for a new order.

Figure 3B:
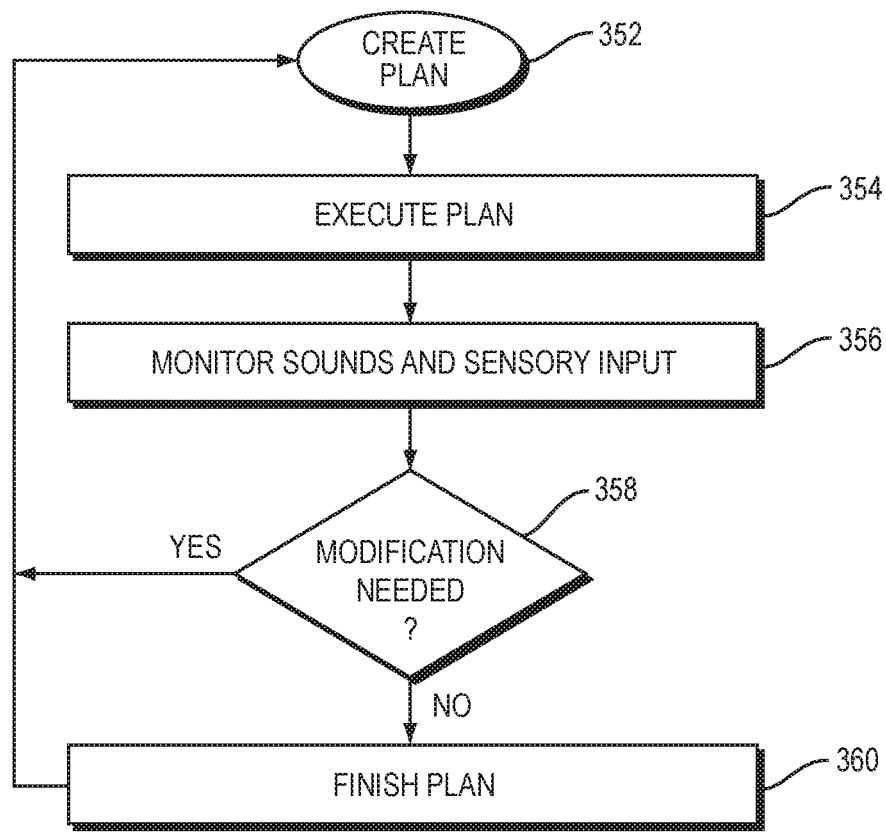
FIG. 3B is a flow diagram illustrating an example embodiment of a process employed by the present disclosure.

FIG. 3B is a flow diagram illustrating an example embodiment of a process employed by the present disclosure. The process first creates a plan (352). The process then executes the plan (354) while monitoring sounds and sensory input (356). If the process determines that the monitored sounds and sensory inputs require modification to the plan (358), the system returns to create the plan again (352). Otherwise, the system finishes the plan (360), and continues to create another plan for a new order, if necessary (352).

Figure 4A:
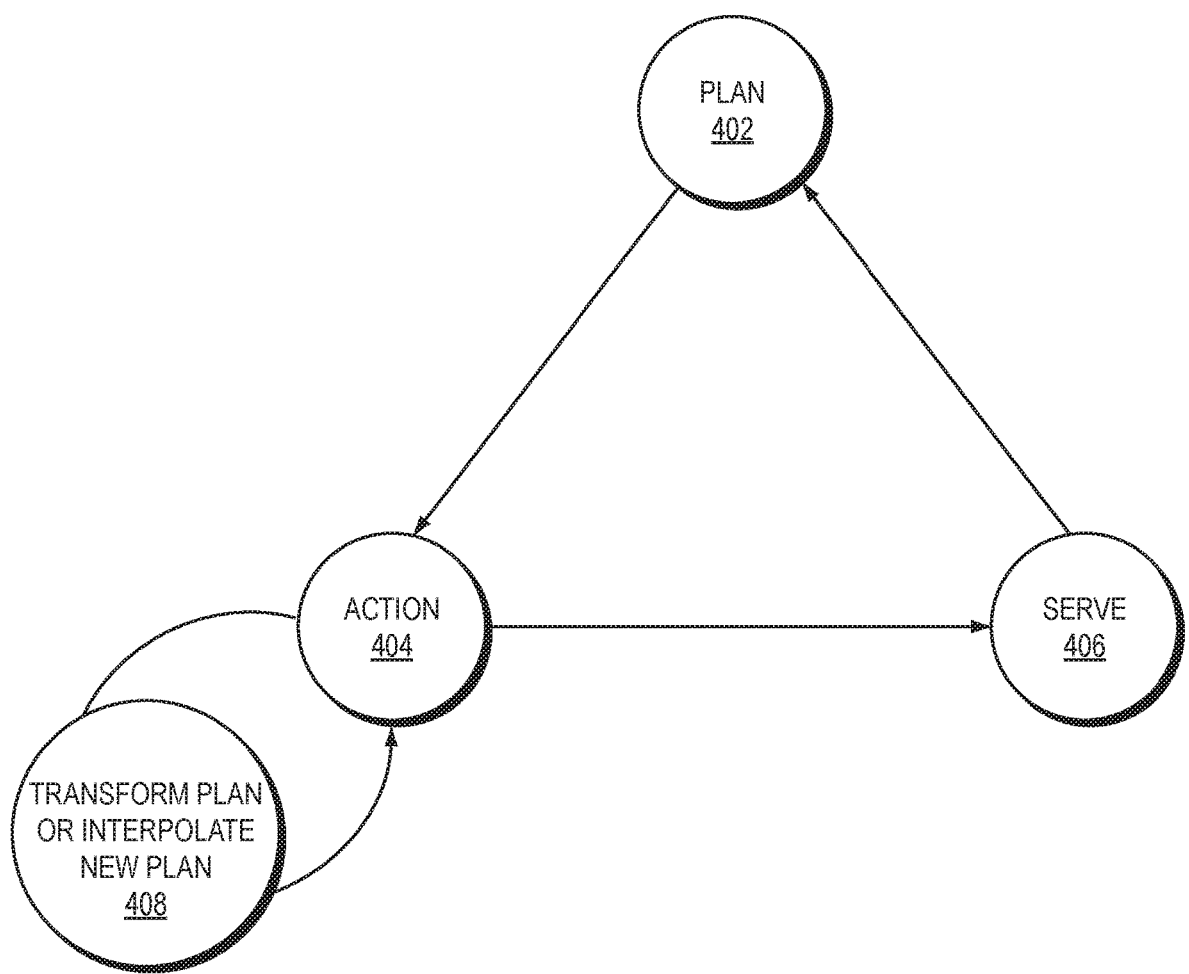
FIG. 4A is a state diagram illustrating an example embodiment of a robot decision making process according to the present disclosure.

FIG. 4A is a state diagram 400 illustrating an example embodiment of a robot decision making process according to the present disclosure. After providing an initial plan 402, during execution of the plan 404 and upon additional input, such as voice modification, the system transforms the plan, or interpolates a new plan 408. Such a modification is possible in food service and certain robotics applications because there is enough time for a human to notice a change, and further ability for the system to act in time. For example, intelligent voice assistants are bots that cannot be modified. Other robotic tasks are things humans cannot understand as they are computed, such as sensor fusion. However, ice cream scooping, or other food applications, are slow enough that a human can intervene and positively affect the outcome of the scooping.

Upon voice input, there are two possibilities for changing the plan. First, the system can transform the plan, or the system can interpolate to a new plan. If transforming the plan, the system can calculate, as the current plan continues, a new plan from the current position, velocity, torque, state of the food container, and amount of food in the container. Alternatively, the system could transition to a previously calculated motion plan that had not been selected. For example, an unselected motion plan may have moved the disher to the right by a number of degrees. That unselected plan can be selected, and a transition motion plan can be calculated to move the tool in position to execute that plan.

Figure 4B:
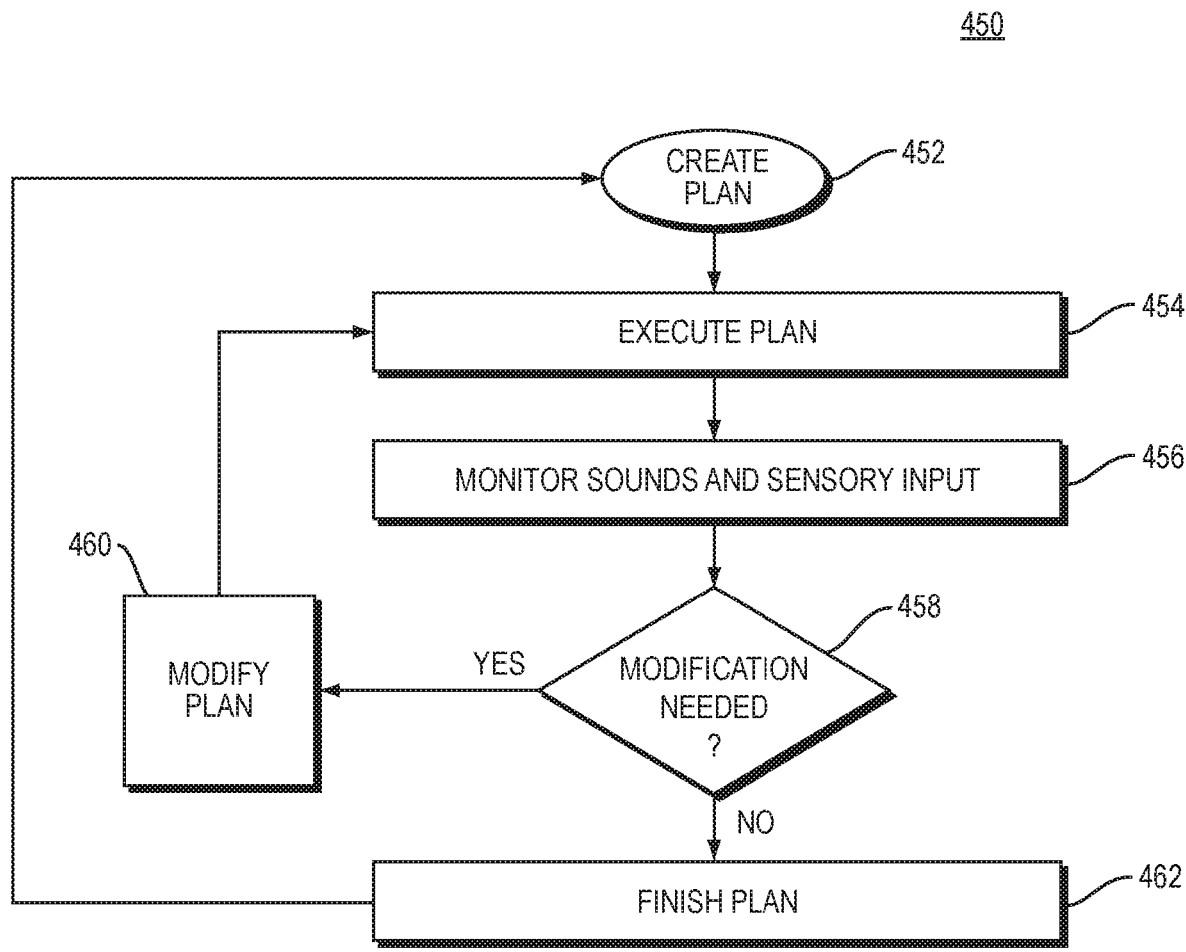
FIG. 4B is a flow diagram illustrating an example embodiment of a process employed by the present disclosure.

FIG. 4B is a flow diagram 400 illustrating an example embodiment of a process employed by the present disclosure. The process first creates a plan (452). The process then executes the plan (454) while monitoring sounds and sensory input (456). In this embodiment, if the process determines that the monitored sounds and sensory inputs require modification to the plan (458), the system modifies the plan (460) instead of creating a new one, and then executes the modified plan (454). Otherwise, the system finishes the plan (462), and continues to create another plan for a new order, if necessary (452).

Figure 5:
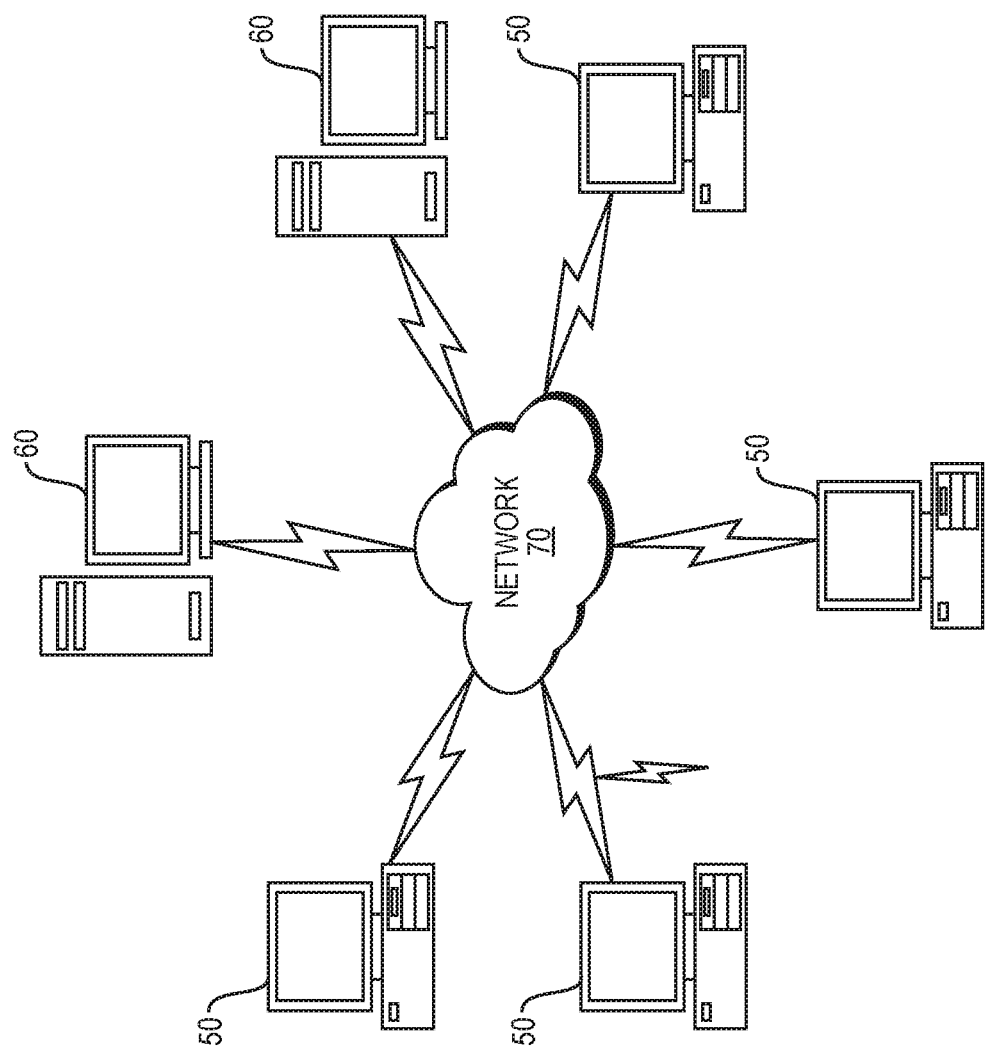
FIG. 5 illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
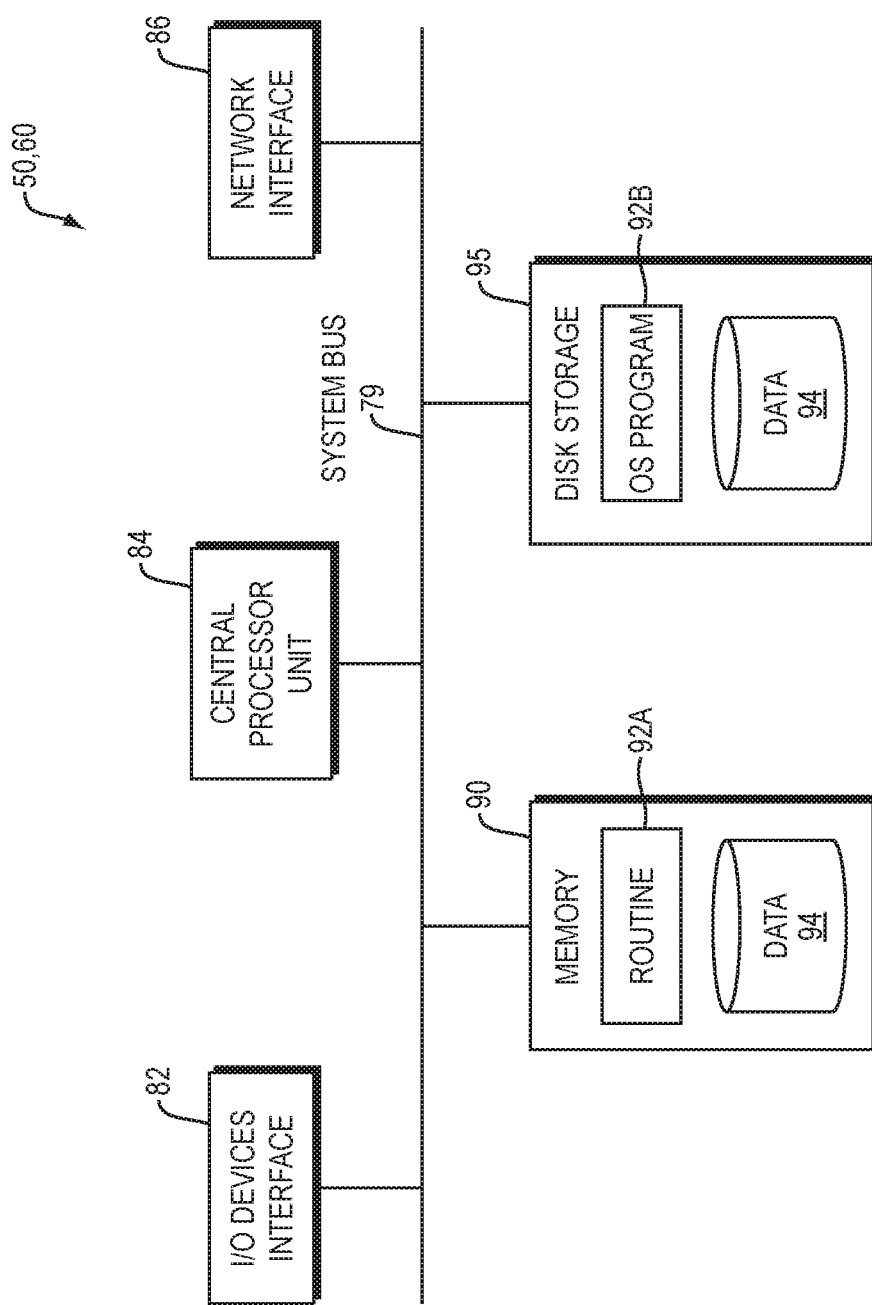
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., plan creation module, plan modification module, and environment monitoring module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   during execution of any action of a plurality of actions by an autonomous system:
   (a) determining a given action of the plurality of actions to modify based on user input received during the execution of the plurality of actions, the given action determined using confidence weights assigned based on the user input, and
   (b) modifying the given action of the plurality of actions based on the confidence weights; and
   executing, by the autonomous system, the plurality of actions modified based on the confidence weights.

2. The method of claim 1, wherein modifying the given action further includes one or more of: determining a new action as the given action, modifying a quantity of material associated with the given action, removing the given action from the plurality of actions, changing a type of material associated with a given action, and repeating a previous action of the plurality of actions.

3. The method of claim 2, wherein modifying the given action further includes calculating one or more transition actions to align the autonomous system with a pose to the plurality of actions having the modified action.

4. The method of claim 1, wherein the user input is at least one of speech, a gesture as detected by a camera, and using a control.

5. The method of claim 1, wherein the plurality of actions is a sequence of ordered actions.

6. The method of claim 1, further comprising notifying the user with information regarding the given action modified either through a visual display, an audio alert, or indication via motion of the autonomous system.

7. The method of claim 1, wherein,
the given action of the plurality of actions has been previously executed by the autonomous system; and
further comprising:
generating at least one modified action to undo the previously executed given action.

8. A system comprising:
a processor; and
a memory with computer code instructions stored thereon, the processor and the memory, with the computer code instructions, being configured to cause the system to:
during execution of any action of a plurality of actions by an autonomous system:
(a) determine a given action of the plurality of actions to modify based on user input received during the execution of the plurality of actions, the given action determined using confidence weights assigned based on the user input, and
(b) modify the given action of the plurality of actions based on the confidence weights; and
execute, by the autonomous system, the plurality of actions modified based on the confidence weights.

9. The system of claim 8, wherein modifying the given action further includes one or more of:
determining a new action as the given action, modifying a quantity of material associated with the given action, removing the given action from the plurality of actions, changing a type of material associated with a given action, and repeating a previous action of the plurality of actions.

10. The system of claim 9, wherein modifying the given action further includes calculating one or more transition actions to align the autonomous with a pose to the plurality of actions having the modified action.

11. The system of claim 8, wherein the user input is at least one of speech, a gesture, and using a control.

12. The system of claim 8, wherein the plurality of actions is a sequence of ordered actions.

13. The system of claim 8, wherein the computer code further causes the processor to:
notify the user with information regarding the given action modified either through a visual display, an audio alert, or indication via motion of the autonomous system.

14. The system of claim 8, wherein the given action of the plurality of actions has been previously executed by the autonomous system; and
wherein the computer code is further configured to generate at least one modified action to undo the previously executed given action.

15. A method comprising:
during execution of any action of a plurality of actions by an autonomous system:
(a) assigning a confidence weight to the plurality of actions based on a received user input;
(b) modifying a neural network that generates a second plurality of actions based on the confidence weight; and
executing, by the autonomous system, the second plurality of actions generated by the neural network.

16. The method of claim 15, wherein the user input is positive, neutral, or negative feedback in relation to at least one of the plurality of actions.

* * * * *